Dec. 6, 1927.  1,652,095
W. COOMBES
MEANS FOR CUTTING FABRICS INTO LENGTHS OR PORTIONS AND
OTHERWISE SUBSEQUENTLY TREATING SAME
Filed March 5, 1927   6 Sheets-Sheet 3
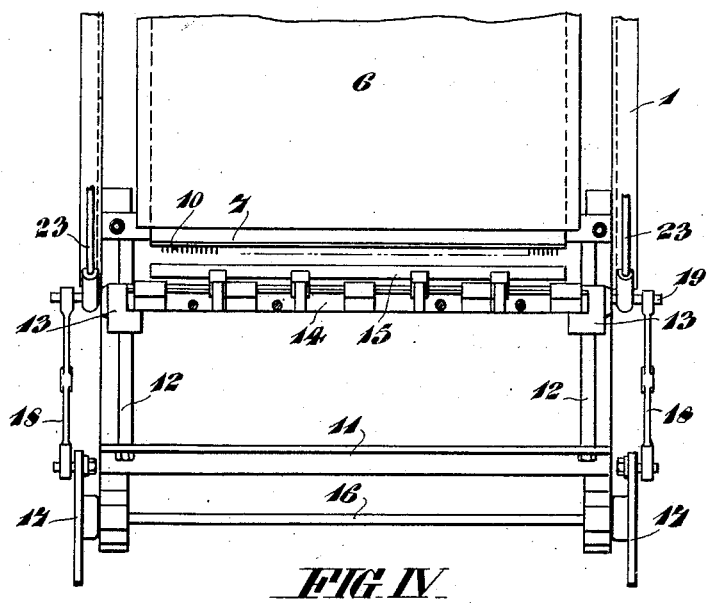
FIG. IV.
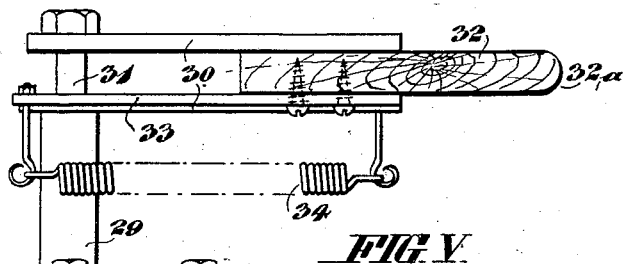
FIG. V.
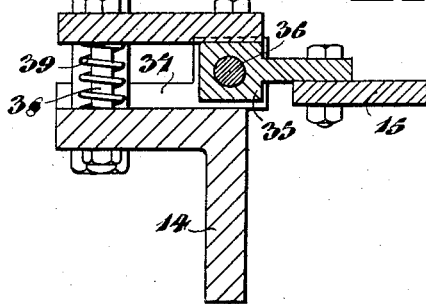
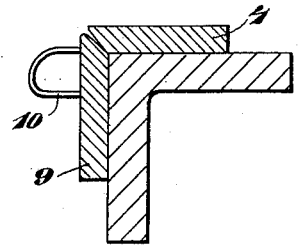
FIG. VI.
Inventor:
William Coombes
By John S. Barker
Atty.

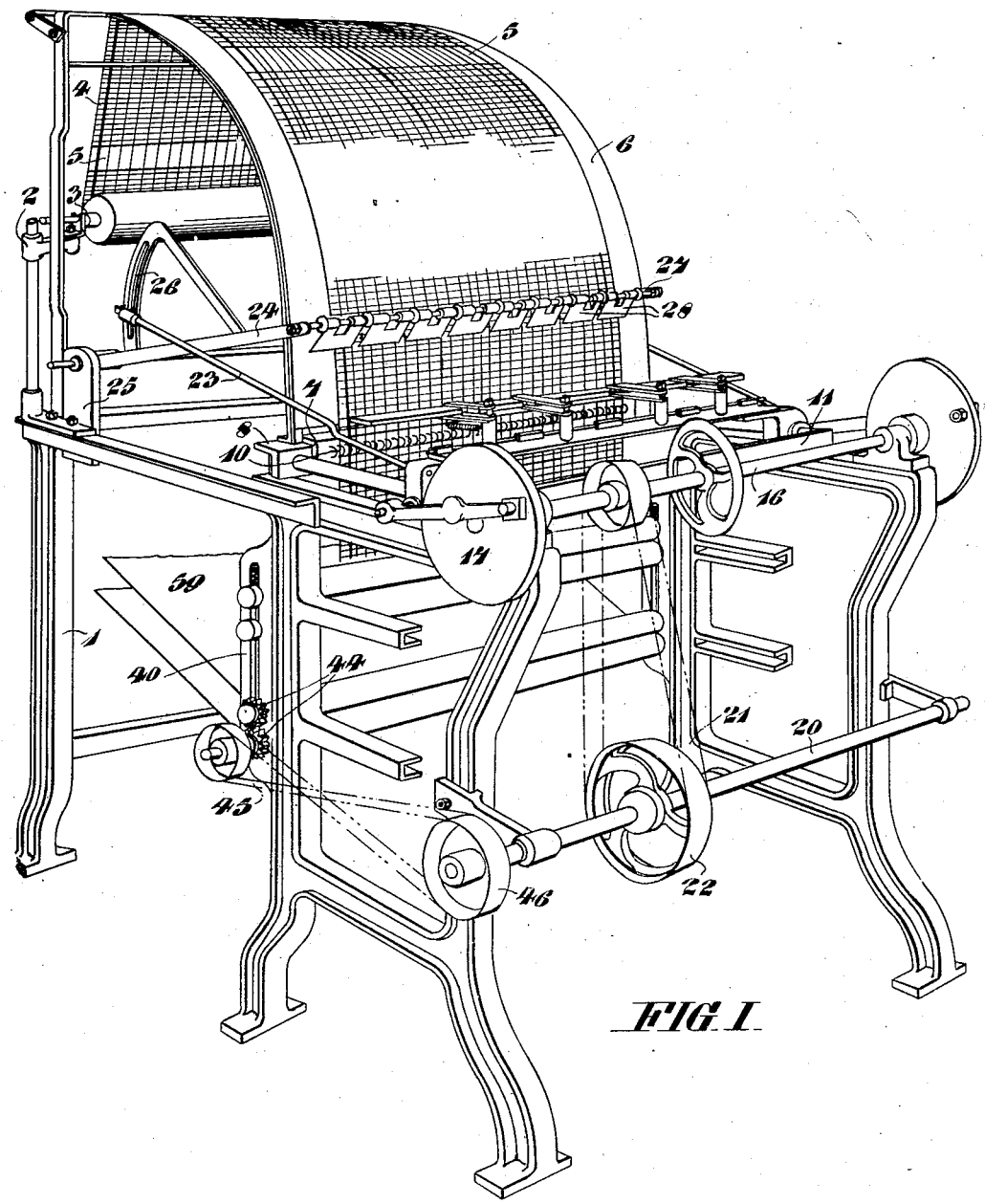
FIG. I

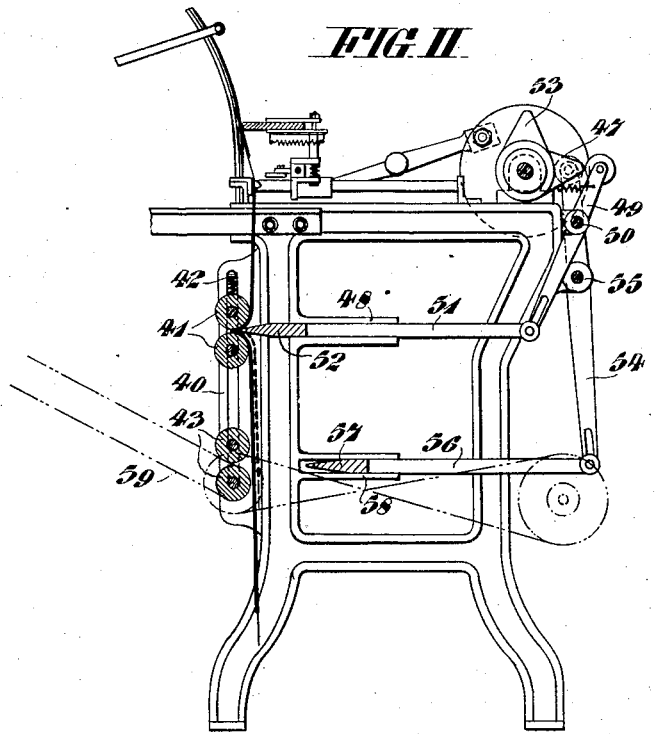
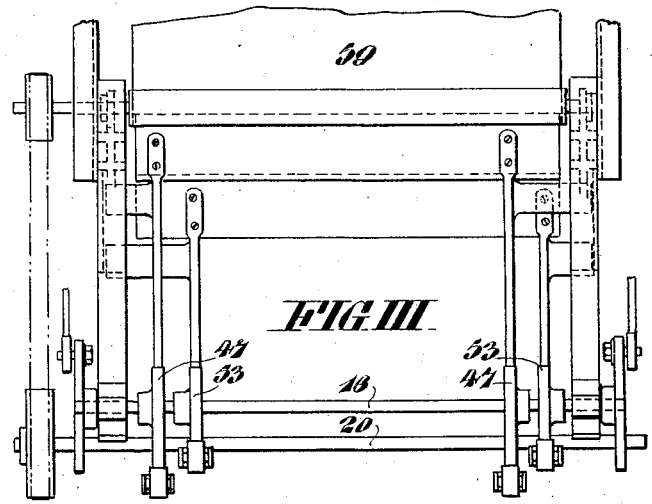

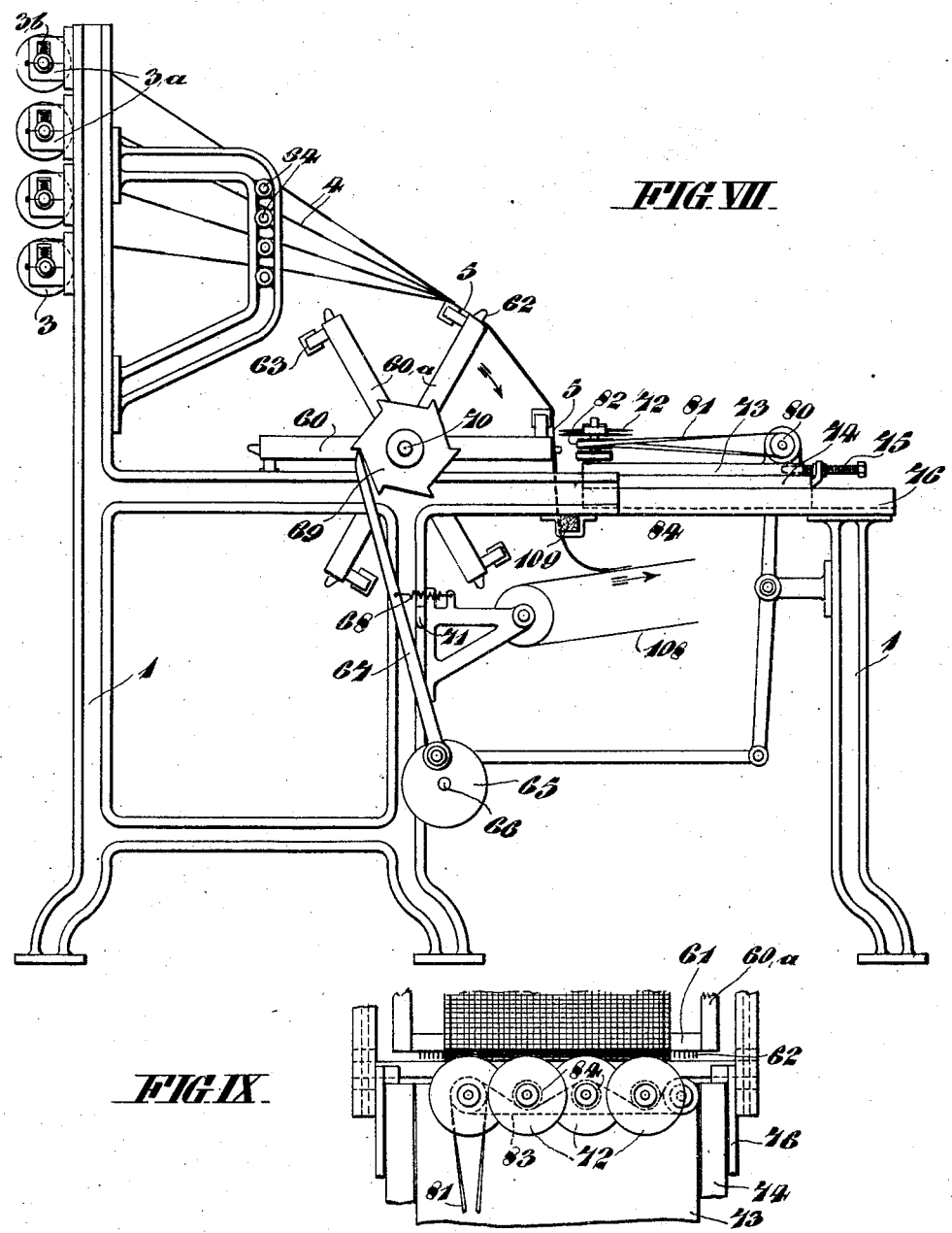

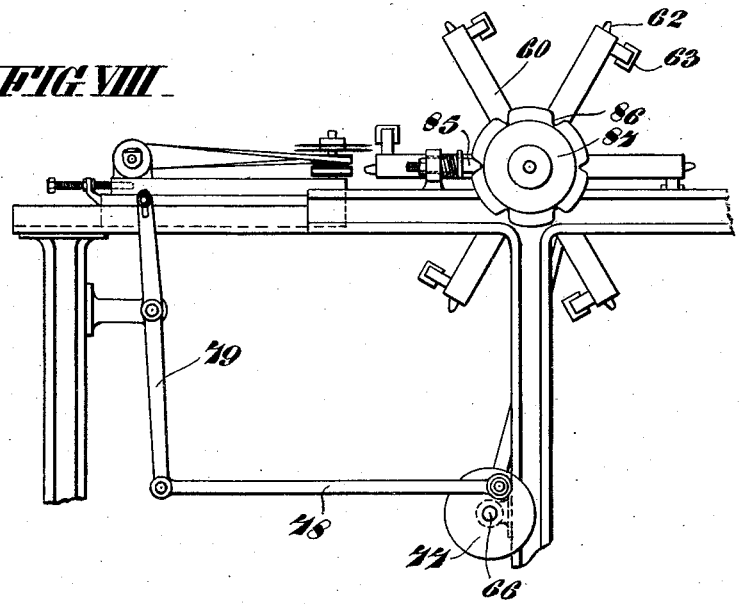
FIG VIII
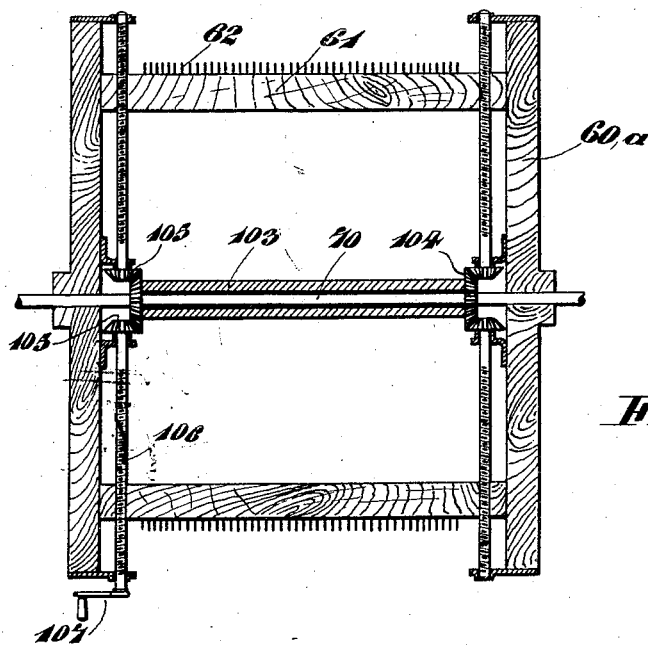
FIG X
Inventor:
William Coombes
By John S. Barker
Atty

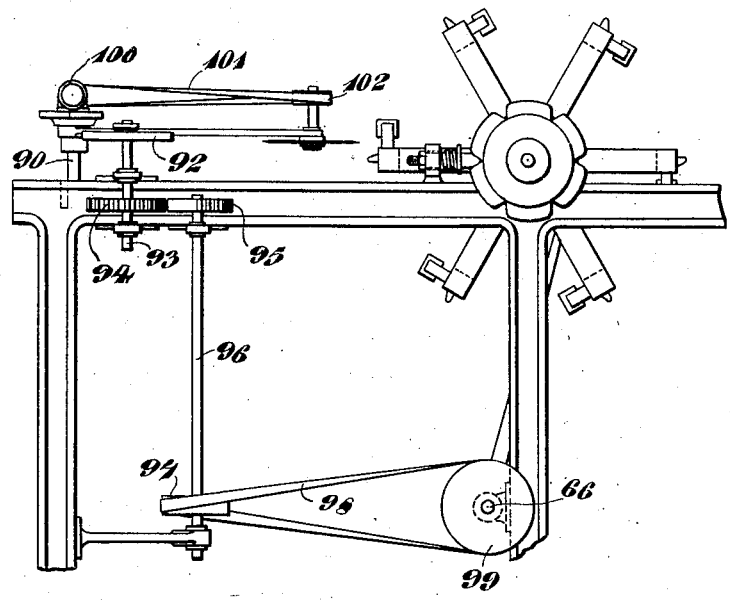
FIG XI.
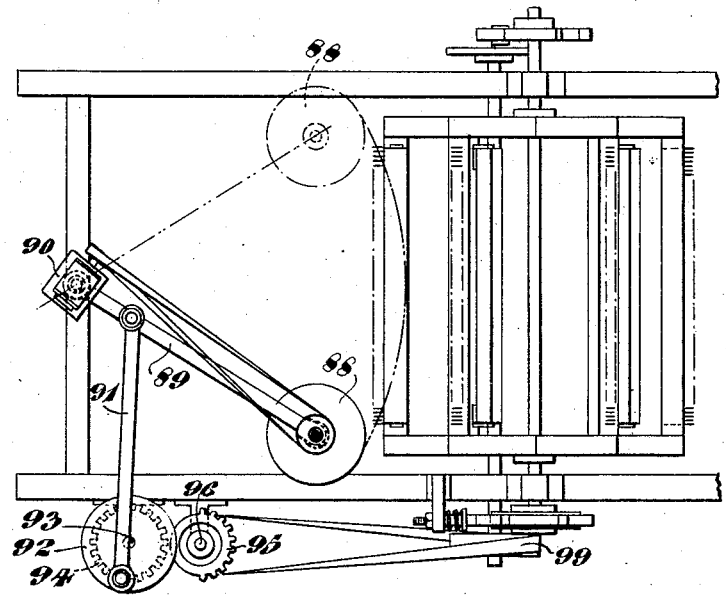
FIG XII.

Patented Dec. 6, 1927.

1,652,095

UNITED STATES PATENT OFFICE.

WILLIAM COOMBES, OF NOTTINGHAM, ENGLAND.

MEANS FOR CUTTING FABRICS INTO LENGTHS OR PORTIONS AND OTHERWISE SUBSEQUENTLY TREATING SAME.

Application filed March 5, 1927, Serial No. 173,017, and in Great Britain November 10, 1925.

This invention comprises improvements in or relating to means for cutting fabrics into lengths or portions and otherwise subsequently treating same.

The invention has particular, though not exclusive, reference, to fabric which is produced in a continuous piece and subsequently cut into the requisite lengths to form towels, cleaning cloths and other like articles. In the manufacture of fabric for producing such articles it is customary at predetermined intervals to discontinue for a certain specified time the lay or feed of the yarn which extends transversely across the longitudinally extending threads and binds together such threads, thus producing lengths of fabric connected at intervals by comparatively narrow transverse bands composed solely of longitudinally extending threads. This, in fabric composed of warp and weft, produces weftless bands between predetermined lengths of complete or "solid" fabric, and for convenience these bands will hereinafter be referred to as weftless divisions.

Heretofore it has been the usual practice to sever by hand the fabric across the middle of the depth of these weftless divisions. Where machines have, however been utilized for this cutting operation, the disadvantage has existed in that should the portions of fabric occurring between the weftless divisions be of varying lengths, said portions are not cut off at the exact required positions, and it frequently happens that the fabric is impaired or rendered useless.

The principal object of the present invention is to provide means of a particularly effective nature by the employment of which the above-named disadvantage is entirely obviated, and towels, cloths or the like are divided in a more expeditious manner than heretofore.

Another object of the invention is to expedite the process of folding the several pieces.

With the above and other objects in view the principal feature of the present invention consists in a machine for cutting fabrics into lengths or portions, in which the positions of severing the fabric are automatically determined by openings provided in said fabric.

Another feature consists in the provision in a machine as above of means whereby the positions at which the fabric is severed are automatically determined by portions of said fabric which embody pairs of longitudinally extending threads having therebetween free transverse spaces, i. e. spaces void of transverse threads.

A further feature consists in a machine whereby fabric which is formed at intervals in its length with transversely extending divisions, bands or sections composed of longitudinally extending threads having therebetween spaces void of transversely extending threads is drawn from a roller or supply and severed at each such division, band or section irrespective, within limits, of the lengths of fabric occurring between such divisions.

It is to be understood that by the terms "longitudinally" and "transversely" is meant longitudinally and transversely relatively to the draw of the fabric.

Another feature consists in the provision in a machine as above of means whereby prior to each cutting operation the fabric is automatically anchored with a weftless division therein positioned for being acted upon by the cutters.

A further feature resides in the provision of means for intermittently drawing off fabric from a supply and delivering same to the cutters, such means being operated in unison with a cutting device.

A still further feature consists in the incorporation of means for folding the fabric portions severed by the machine, while a further feature consists in providing means for conveying the folded fabric from the machine to any required position.

Another feature consists in constructing a machine as above so as to withdraw fabric simultaneously from a plurality of supply rollers and cut the required portions or lengths simultaneously from each piece of fabric withdrawn.

Yet another feature consists in the incorporation in a machine as above of a fabric feeding device comprising a rotary frame furnished with elements which serve the dual purpose of intermittently withdrawing the required quantity of fabric from the supply and anchoring the fabric in position for being acted upon by the cutter.

Further features reside in the provision of a rotary cutting device and means for alternately moving said device into and out of cutting position, and means for enabling the length or quantity of fabric withdrawn and severed at each operation to be variably adjusted as required.

Other features reside in the construction and arrangement of machine and method of operation as hereinafter more fully described and set forth in the appended claims.

For the purpose of more fully describing the nature of this invention, reference will now be made to the accompanying drawings, wherein:

Figure 1 illustrates in perspective a machine for cutting and folding fabric, part of the folding mechanism being excluded for the sake of clearness.

Figure 2 is a sectional side elevation through the front part of the machine and including the folding mechanism.

Figure 3 is a plan view of Figure 2, but with the cutters and associated parts excluded.

Figure 4 is a plan view of the front part of the machine with the folding mechanism excluded.

Figure 5 is a sectional detail view showing on an enlarged scale the movable cutter and fabric holding means associated therewith.

Figure 6 is a sectional detail view of the stationary cutter and fabric anchoring means.

Figure 7 is a side elevational view illustrating a modified construction of machine.

Figure 8 is an elevational view of part of the machine shown in Figure 7 looking at the opposite side thereof.

Figure 9 is a plan view showing the cutters used on the machine illustrated in Figures 7 and 8.

Figure 10 is a section through the rotating frame showing means for adjusting the diameter thereof.

Figure 11 is a side elevational view showing a further modified construction.

Figure 12 is a plan view of Figure 11.

In the one method of carrying out the invention illustrated in the drawings at the rear of a frame 1 of any convenient design are provided two adjustable brackets 2 which support the ends of a rotatable beam or roller 3 upon which is wound the towelling or other fabric 4 to be cut. This fabric 4 is, as before stated, formed at intervals in its length with weftless divisions 5 composed solely of longitudinally extending threads, at which divisions it is desired the fabric shall be cut.

The fabric from the roller 3 extends over a forwardly and downwardly curved or inclined guide plate 6 the lower horizontal edge of which is disposed immediately over a stationary cutter 7 suitably mounted upon a transverse frame bar 8.

Immediately beneath and in front of the cutting edge of said fixed cutter 7 is a transversely extending bar or part 9 from the forward face of which project a series of approximately U shaped wires 10. In lieu of these wires, rounded plates may be installed. These wires are spaced laterally so as to project through the fabric 4 at the weftless divisions 5 in the manner and for the purpose hereinafter set forth.

Mounted at each end of the machine between the aforesaid transverse frame bar 8 and a front transverse bar 11 is a guide bar bar 12 on which bars are slidably mounted sleeves 13 carrying an angle or other bar 14 which carries directly or indirectly a movable cutter 15.

A sliding movement of the sleeves 13 on the guide bars 12 to reciprocate the cutter 15 is transmitted from a power shaft 16 through the medium of disc or other cranks 17, connecting rods 18 and pins 19 projecting from the ends of said sleeves 13, rotary motion being transmitted to the shaft 16 from any convenient source such as a second shaft 20 through belt 21 and pulleys 22.

To the pins 19 projecting from the sliding sleeves 13 are connected two rearwardly extending rods 23, the rearmost ends of which are connected to the sides of a swivelling frame 24 pivotally mounted within bearings 25 located at the rear sides of the machine frame 1. The rods 23 are preferably connected to slotted quadrants 26 or like parts at the sides of the frame 24 so as to enable the movement transmitted to the frame to be variably adjusted.

The front transverse bar 27 of the swivelling frame 24 extends over the front face of the fabric guide plate 6 and has mounted thereon a plurality of pivoted spring-influenced plate members 28 which are resiliently pressed on to the fabric passing over the plate 6, said members 28 if desired pressing the fabric on to the face of a transverse bar or strip carried by the frame bar 27.

Projecting up from the angle bar or the like 14 which carries the reciprocating cutter 15 are posts 29 at the upper end of which are secured a plurality of pairs of horizontally disposed guide plates 30 spaced apart vertically by bolt-like members 31 at the top of the posts 29. Between these plates 30 is slidably accommodated a flat bar 32 rounded at its one longitudinal edge $32^a$, said bar being screwed or otherwise fixed to links 33 extending alongside the lower guide plates 30, springs 34 anchored at front end to the said lower guide plates and at the rear end to the links 33 serving normally to press the bar 32 forward towards the fabric.

In operation, on the rearward movement of the sleeves 13 and movable cutter 15, the pivoted frame 24 is swung over downwardly and the spring plates 28 draw a length of the fabric from the supply 3 down over the plate 6. This fabric depends in front of the stationary cutter 7, and the amount drawn at one motion is such as to bring a weftless division 5 a short distance below said cutter. On the forward or cutting stroke of the movable cutter 15, the frame 24 is swung over upwardly and during the first part of this movement the spring plates 28 will pull the fabric below same upwardly until the weftless division reaches the projecting wires 10, which wires will project between the threads of said division and hold the fabric from further movement by engagement with the edge of the adjacent portion of the completely woven fabric, said fabric being thus anchored with the division 5 directly over the cutter 7.

During the continued forward movement of cutter 15 the presser bar 32 is carried forward to press resiliently against the fabric, said bar serving to prevent the fabric from being pulled up by the spring plates 28 on the frame 24 during the actual cutting stroke and ensuring that at each feed of the fabric the weftless division is disposed in a line exactly at right angles to the length of the fabric. The incorporation of this presser is advantageous in view of the fact that the movable cutter 15 being disposed at an angle to the stationary cutter 7 has a shearing action on the fabric, and if the fabric is not held from movement during cutting, the upward pull on said fabric would leave the fabric at an incline for the next cut.

When the cutter reaches the end of its cutting stroke the fabric feed frame 24 has reached the end of its upward or backward movement and the feed motion is repeated.

Conveniently the movable cutter is secured to a plurality of members 35 capable of pivotal movement upon a transverse spindle 36 which is carried by bearings 37 bolted to the angle bar 14. Also bolted to the angle bar 14 are small bolts 38 which are influenced by springs 39 normally to press down upon the cutter carrying members 35. As the cutter 15 coacts with the stationary cutter 7, the former is permitted a small tilting movement upon the spindle 36 against the resistance of the springs 39, and an effective cutting action is maintained along the length of the blades.

Means may be incorporated on the machine for folding the severed towels or fabric portions and conveying same to any required position. In the method of accomplishing this illustrated in the drawings, two pairs of rollers are mounted transversely across the machine within slotted bearing brackets 40, the upper rollers 41 being pressed together by one or more springs 42, while the lower pair of rollers 43 have intermeshing cogs 44 which cause same to rotate in opposite directions, the rotation of rollers 43 being effected by any convenient means such as by a belt 45 from a pulley 46 fixed upon the shaft 20.

On the shaft 16 are keyed a pair of cams 47, Figs. 2 and 3 upon which ride trucks at the upper ends of a pair of levers 49 pivoted between their ends upon a spindle 50, the lower ends of said levers 49 being connected by pin and slot connection to horizontally disposed arms 51 carrying at their forward ends a transversely extending bar 52 with wedge-shaped forward edge. This bar 52 is guided within end guides or channels 48, the action being such that when a rise on the cams 47 coacts with the levers 49 these are pivoted to move forward the bar 52 and insert the wedge portion thereof between the upper rollers 41. When the cam trucks have ridden over the cam rises, the bar 52 is moved back from the rollers 41 by suitable spring means.

A second pair of cams 53 on shaft 16 operate through levers 54 pivoted on a spindle 55 and through arms 56 connected to said levers to reciprocate a second wedge bar 57 guided in channels 58, this second bar 57 coacting with the lower rollers 43.

In operation, the cams 47 are timed to press forward the bar 52 subsequent to the anchoring and prior to the severing of the fabric so as to press a creased portion of the fabric between the rollers 41 to be gripped thereby. The bar 52 is immediately retracted and the fabric cut, after which that part of the cut fabric above the rollers 41 falls down in front of the remainder as shown in dotted lines in Figure 2, thus forming one fold. While the fabric is so held by the rollers 41, the other cams 53 come into operation to reciprocate quickly the lower bar 57, so as to press the once-folded fabric between the lower rollers 43 and quickly retire. The rollers 43 by reason of their rotation draw the once-folded fabric away from the upper rollers 41, the fabric passing between said rollers 43 to form a second fold, such folded fabric being received upon a travelling band or apron 59 which inclines upwardly from the lowermost of the rollers 43 and conveys the cut and folded fabric to any desired position such as a table at the rear of the machine.

It will be appreciated that by adjusting the position of the pairs of rollers 41, 43 and also of the channel guides 48, 58 for the bars 52, 57, the manner of folding may be varied. For example the fabric may be folded into four folds or layers instead of three as shown. The connection between the pivoted cam levers 49, 54 and the horizontal arms 51, 56 would also be adjustable for this purpose.

The invention may be modified in order to adapt same for simultaneously cutting cloths or fabric portions from a plurality of fabric lengths each withdrawn from a separate supply roller or beam.

In one method of accomplishing this the fabric rollers 3 (four of which may for example be provided as represented in Fig. 7) are mounted one above the other to rotate within brackets or bearings 3ª adjustably or otherwise carried at the rear part of the machine frame 1, the brackets at either or both ends of the rollers in this and preferably also in the before described construction, being hinged or formed with a hinged or displaceable portion for facilitating the withdrawal of an empty roller or beam and the insertion of a fresh roller.

Mounted to rotate intermittently on a horizontal axis at a suitable distance in front of and preferably at a lower level than the rollers 3 is a frame member 60 which comprises a plurality, say for example six, of equally spaced radially extending end arms 60ª between which at or near their extremities are transversely or horizontally extending bars 61, somewhat in the nature of a yarn winding mill, each of said horizontal bars having a series of U-shaped wire elements 62 or their equivalent projecting radially from its outer face. A second bar 63 is fixed to extend alongside each bar 61 and is spaced a short distance from said bar.

The fabric lengths 4 with weftless divisions 5 are withdrawn from the rollers 3 and suitably guided forwardly to extend over the above named rotatable frame 60, said fabric being adapted to depend in front of the foremost bars 61, 63 of said frame. Preferably the fabric 4 is guided to the rotating frame and the separate lengths of said fabric maintained out of contact with each other prior to reaching the frame 60 by suitably disposed and adjustably mounted rollers or the like 64.

The arrangement is such that as the frame 60 rotates in the direction of the arrow shown in Figure 7, the wire elements 62 carried by each bar 61 as it travels over the upper-most position in its circular path comes into engagement with a weftless division 5 in all of the superposed fabric lengths 4 passing over said arm, said elements 62 being caused to project up through the several weftless divisions and, by continued rotation of the frame, exert a forward pull upon the several fabric lengths, the rotation being continued until the bar 61 having the wire element 62 which projects through the fabric is located in the most forward position with the side arms 60ª carrying same horizontal, when the frame 60 is held from rotation.

In this position a suitable cutter such as hereinafter described comes into operation to sever the several fabric pieces at the weftless divisions immediately above the wire anchoring elements 62 carried by the foremost bar 61, such cutter operating between said bar and the bar 63 spaced a short distance above same.

Immediately this cutting operation has been effected the frame 60 continues to rotate to draw forwardly and downwardly a further number of superposed fabric pieces to be severed, the rotation of the frame being intermittent to permit of the cutting operations. It is to be understood that at each rotative movement of the frame 60 certain of the anchoring elements 62 function to engage with and project through weftless divisions in each of the fabric lengths 4 thus drawing off at each motion the required length to be severed from each fabric piece 4.

The intermittent rotation of frame 60 may be effected from a disc crank or eccentric 65 carried by shaft 66 driven from any convenient source of power, said crank carrying a pivoted pawl 67 projecting upwardly therefrom and held in engagement by a suitable spring 68 with a ratchet wheel 69 keyed on the central spindle 70 of frame 60, the number of teeth on the ratchet coinciding with, and being angularly spaced to the same extent as, the arms 60ª. By this arrangement one half of each revolution of the crank 65 effects a rotative movement of the frame 60 to the extent of one sixth of a complete revolution while during the other half of the revolution of the crank the frame is held stationary and the pawl 67 is moved down to engage with another tooth on the ratchet 69 prior to the next movement of the frame. A suitable stop 71 limits the lateral movement of the pawl 67 under the influence of its spring.

During the stationary period of the frame the cutting operation is effected, and in one method of accomplishing this a plurality of rotary cutting discs 72 are rotatably mounted upon separate laterally aligned axes, said discs being arranged to overlap each other to a suitable extent. These cutters are mounted upon a suitable plate or frame 73 which is slidably adjustable within or upon another plate or frame 74 in a direction at right angles to the axis of the rotary frame 60, the adjustment being effected by any suitable means such as a screw member 75.

The plate or frame member 74 is also slidable to and fro within suitable guides 76 carried by or forming part of the machine frame 1, this reciprocative sliding movement of the frame 74 being required in order to move the cutters 72 alternatively into and out of engagement with the fabric 4, the cutters being brought into engagement with the fabric when the frame 60 is stationary and moved away from said fabric after the cutting operation and before the frame 60 commences to rotate to bring further fabric into position for cutting.

This reciprocative movement of the frame 74 with cutters 72 may be effected from the shaft 66 through the intermediary of a second disc crank 77 carried by this shaft, a horizontally extending rod or link 78, an upwardly extending centrally pivoted lever 79 pivotally connected at its lower end to rod 78 and at its upper end by pin and slot connection to the sliding frame 74. The operation is so timed that while the pawl 67 is rotating the frame 60 the frame 74 is away from the fabric and while said pawl 67 is being brought down and the frame 60 is maintained stationary, the frame 74 is moved towards the fabric so as to enable the cutters to sever same.

Simultaneous rotating of the cutting discs may be effected in any desired manner such, for example, as by mounting a small motor on the frame 73 moving with the cutters and transmitting motion from the motor to the cutters by driving band 81 which passes over a pulley 82 on the axis of one of the cutters; a second endless band 83 being passed over pulleys 84 on the axes of the several cutters.

To retain the frame 60 from displacement while cutting is being effected a small spring pressed pin 85 (Figures 8 and 11) may be provided adapted to engage with one of a series of peripheral notches 86 in wheel 87 fixed upon the central spindle 70 of the frame, the number of said notches coinciding with the number of radiating arms 60ª of the frame.

Instead of employing a plurality of cutting discs as above the cutting of the fabric may be accomplished by a single cutter. One method of effecting this is illustrated in Figures 11 and 12.

A cutting disc 88 is rotatably carried at the one or forward extremity of an arm 89 which arm is pivoted at its rear end on a pin 90. The arm 89 with cutter is adapted to be intermittently displaced so as to move the cutter alternately to each side of the machine and in its travel across the machine to cut the fabric, the angle of movement of the arm being sufficient to move the cutter through the fabric and clear of same at each stroke, this movement being timed so that while the frame 60 is being rotated the arm 89 is stationary, and while the frame 60 is stationary the cutting stroke is effected.

In one method of accomplishing this the arm 89 has pivotally connected thereto at a suitable position in its length the one end of a rod 91, the other end of said rod being connected to a disc crank or eccentric 92 keyed upon a vertical rotatable shaft 93 suitably carried by the machine frame or parts thereon. On this shaft 93 is keyed a gear wheel 94 which is adapted to mesh intermittently with a gear wheel 95 having teeth on one half of its circumference only. This half cog 95 is keyed upon a further vertical rotating shaft 96 having fixed thereon a pulley 97 over which passes a driving band 98 which band also passes over a second pulley 99 on the before mentioned shaft 66. The arrangement is such that as the shaft 96 with half cog 95 rotates, the latter transmits during one half of its revolution rotary motion to the gear wheel 94 and the disc crank rotating therewith, during which movement the cutter arm 98 is, through the medium of the connecting rod 91, angularly displaced to traverse the cutter across the machine. During the second half of the revolution of the half cog 95—which coincides with the rotative movement of the frame 60—no motion is transmitted to the cutter arm by reason of there being no intermeshing engagement between the half cog 95 and the gear wheel 94.

The necessary rotary movement of the cutter 88 is, in this arrangement, also advantageously effected from a small motor 100 suitably carried at the rear or pivoted end of the arm 89 so as to be moved with said arm, a driving belt 101 extending from a pulley of the motor to a pulley 102 fixed to the cutter axis.

In order to vary the effective diameter of the cutting frame 60 so as to adapt the machine for use in cutting varied lengths of fabric, i. e. fabric in which the distance between the weftless divisions vary, the transversely extending arms 61 together with the adjacent arms 63 are so mounted as to be adjusted radially of the arms 60, means being preferably provided whereby the whole of the arms 61 and 63 are adjustable simultaneously to an equal degree. This may be effected as shown in Figure 10 by mounting upon the central spindle 70 a rotatable sleeve 103 having fixed at each end thereof a bevel 104, each bevel intermeshing with a series of other bevelled sleeves 105 fixed at the near end of screw threaded spindles 106 rotatably borne within suitable brackets or members on the inner side of each of the radial arms 60ª of the frame 60. Where six radial arms 60ª are provided at each end of the frame six screwed spindles 106 and an equal number of smaller bevels 105 would be furnished at each end of said frame. Two of the screwed spindles 106 pass through internally screw threaded holes in each transversely extending arm 61 and the arrangement is such that by transmitting rotation to any one of the screwed spindles 106 by means of a handle 107 rotative movement is transmitted to the sleeve 103 and bevels carried thereby, which in turn transmits rotation to the whole of the bevels 105 and spindles 106, and by reason of the screwing engagement between said spindles 106 and bars 61 the latter simultaneously move either inwardly or outwardly in accordance with the direction of turning of the handle. It will be appreciated that the spindles 106 on the one end of the frame are provided with right hand screw threads while the spindles at the other end of the frame have left hand threads.

Any suitable means may be provided for applying tension to the fabric lengths 4 withdrawn from rollers 3. For example the spindles of the rollers may be frictioned by springs 3ᵇ or friction may be applied to the surfaces of the fabric rollers.

The severed portions of fabric may be received upon a continuously travelling belt 108 (Figure 7), a guide bar 109 being, if desired, provided for ensuring that the severed fabric in falling is properly laid upon the belt 108.

I do not in this application make specific claim to the forms of my invention illustrated in Figs. 7 to 12 inclusive, as such forms are made the basis of an application, Serial Number 230,843, filed by me on the third day of November 1927 as a division of this case and claimed in such application.

I claim:

1. A machine for cutting into short lengths a textile fabric formed with weftless divisions, comprising means adapted to extend through the weftless divisions of the fabric and engage with the edge of an adjacent portion of the complete fabric, and cutting means for severing the fabric across said divisions adjacent to the said means that extend through and engage with the fabric.

2. A machine for cutting into short lengths a textile fabric formed with weftless divisions, comprising means that extend through the said weftless divisions on lines transverse to the fabric, means for severing the fabric transversely across the said weftless divisions on lines adjacent to the means that extend through the fabric, and means for causing the cutting means to act while the aforesaid means extend through the weftless division of the fabric where the severing cut is being made.

3. In a machine for cutting into short lengths a textile fabric formed with weftless divisions, comprising a fabric cutter, means for feeding the fabric to the cutter, and anchoring means for holding the fabric during the cutting operations extending through the said weftless divisions.

4. A machine for cutting into short lengths a textile fabric formed with weftless divisions, comprising cutting means for severing the fabric transversely across said divisions, means for intermittently advancing the fabric into position to be severed, and anchoring means arranged to extend through the weftless divisions of the fabric and hold the same after the forward feeding of the fabric has been completed and during the time the severing operation is taking place.

5. A machine for cutting into short lengths textile fabrics formed with weftless divisions, supports for a plurality of rolls of such fabric, means for guiding the fabrics from the said rolls to the position where the severing operations are to take place in superposed relations, means for withdrawing the fabrics from their supporting rolls intermittently, anchoring means extending through the fabrics at the weftless divisions to retain the fabrics in position for cutting, means for simultaneously cutting transversely the superposed fabrics along the weftless divisions thereof, and means for operating the cutting means to sever the fabric along lines adjacent to the anchoring means whereby the latter serve to determine the location of the lines of severance.

WILLIAM COOMBES.